United States Patent [19]

Tully et al.

[11] 4,387,195

[45] Jun. 7, 1983

[54] HYDROPHOBIC CERAMIC WARES

[76] Inventors: Paul R. Tully, 42 Windward Rd., Lowell, Mass. 01852; Thomas N. Kell, 70 Yale St., Winchester, Mass. 01890

[21] Appl. No.: 285,364

[22] Filed: Jul. 20, 1981

[51] Int. Cl.$^3$ .............................................. C04B 33/00
[52] U.S. Cl. ..................... 525/475; 52/101; 52/117; 52/726; 427/220; 427/387; 428/446; 428/447; 428/454; 501/141; 501/144; 501/153; 501/154; 525/437; 525/588; 525/858; 525/860
[58] Field of Search ............... 501/141, 144, 154, 153; 427/387, 220; 525/475

[56] References Cited

U.S. PATENT DOCUMENTS 4,141,751  2/1979  Moreland ..................... 427/220 X
4,183,760  1/1980  Funk et al. ..................... 501/144
4,255,316  3/1981  Buizzard ........................ 501/153
4,255,549  3/1981  Christophliemk et al. ..... 427/387 X
4,307,023  12/1981  Ettlinger et al. ................ 106/288 B Primary Examiner—Helen M. McCarthy
Attorney, Agent, or Firm—Kenneth W. Brown

[57] ABSTRACT

Disclosed herein are fired ceramic wares possessing hydrophobic properties throughout the bodies thereof. The ware is prepared utilizing a water-reduced ceramic body composition containing a quantity of a finely-divided sub-micron amorphous silica or alumina. This ceramic body composition is formed into a green ware, the ware dried and fired at relatively low temperature and the fired ware treated with one or more reactive organosilicon compounds whereby organosilicon groups are caused to chemisorb onto the surface of the finely-divided amorphous oxide component.

15 Claims, No Drawings

HYDROPHOBIC CERAMIC WARES

BACKGROUND OF THE INVENTION

The present invention relates generally to fired ceramic wares and is more particularly concerned with the preparation of fired ceramic wares exhibiting hydrophobic characteristics throughout the bodies thereof.

It is often desirable to provide ceramic wares with hydrophobic characteristics. Conventionally, ceramic wares are waterproofed or rendered water-repellent by vitreous glazing or by coating or impregnation thereof with diverse water-repellent liquids such as water-glass, waxes, greases, hydrocarbon oils or organosilicone fluids. In the case of vitreous glazing the surface of the ware is provided with a continuous glassy surface coating, said coating serving to prevent the passage of water therethrough into the body of the ware. However, since glazing is only a surface treatment, the body of a glazed ceramic ware is itself not rendered hydrophobic. Therefore, should the continuity of the protective glaze be imperfect, or broken, the body of the ceramic ware can then absorb water through such glaze defect. Moreover, glazing does not ordinarily provide surface water-repellency of such degree that water will quickly bead up and flow readily from a glazed surface. Rather, it is more common that glazed ceramic wares, particularly upon weathering thereof, are sufficiently wettable as to allow the formation of water films thereover. This represents a particularly acute problem as regards glazed ceramic high voltage insulators commonly employed in conjunction with power lines. The surface dielectric properties of such insulators can often degrade substantially upon exposure to rain, fog, snow, ice or condensation and the resulting power losses associated with such degradation can be considerable.

There are commercially available waterproofing compositions which can be applied to structural ceramics such as bricks and tiles. Unfortunately, such coatings are usually only temporarily effective, do not confer hydrophobicity throughout the entire body of the ware and are difficult to apply uniformly. Moreover, the use of such coatings can often diminish the permeability of the ceramic ware treated therewith, which permeability is often a desirable characteristic.

In outdoor applications, upon breakdown of a waterproof coating or glaze, water usually enters into the body of a ceramic ware and can cause severe physical degradation thereof, particularly when the ware is subjected to freeze-thaw cycling. In accordance with the present invention, however, there is provided a method for the preparation of novel fired ceramic wares possessing exceptional surface water-repellency and hydrophobic properties throughout the ceramic bodies thereof.

OBJECTS OF THE INVENTION

It is an object of the invention to provide novel hydrophobic fired ceramic wares.

It is another object of the invention to provide fired ceramic wares having hydrophobic properties substantially completely through the ceramic bodies thereof.

It is yet another object of the invention to provide unglazed fired ceramic wares which are substantially permanently water-repellent and whose surfaces have very low attractive forces with respect to water.

It is still another object of the present invention to provide unglazed ceramic wares exhibiting water-repellent surface characteristics and which surface characteristics are preserved despite chipping or other physical trauma being done to the wares.

It is another object of the invention to provide a novel method for the production of hydrophobic fired ceramic wares.

It is yet another object of the invention to provide a method for the production of hydrophobic fired ceramic wares wherein hydrophobicity is imparted throughout the bodies of the wares.

It is another object of the invention to provide a method for the production of hydrophobic fired ceramic wares having exceptional water-repellent characteristics.

It is another object of the invention to provide novel fired ceramic constructions adapted to act as effective barriers to crawling insects.

It is another object of the invention to provide novel fired ceramic electrical insulators whose surface dielectric properties are preserved despite exposure to rain, fog, condensation and the like.

It is another object of the invention to provide novel fired ceramic electrical insulators of the foregoing type whose surface dielectric properties are preserved despite chipping or other physical trauma being done to the surfaces thereof.

Other objects and advantages of the present invention will in part be obvious and will in part appear hereinafter.

SUMMARY OF THE INVENTION

In accordance with the invention it has been discovered that the foregoing and other objects can be achieved by (a) providing a water-reduced ceramic body composition having dispersed therein an effective amount of finely-divided amorphous oxide component selected from the group consisting of alumina, silica and mixtures thereof, (b) forming said composition into a green ware, (c) drying and firing said green ware at below the sintering temperature of said amorphous oxide component and (d) permeating the fired ware with one or more reactive organosilicon compound fluids and reacting said organosilicon compound(s) with said dispersed amorphous oxide component of said fired ceramic composition so as to chemisorb a hydrophobically effective concentration of organosilicon groups to the surface thereof.

DESCRIPTION OF THE PREFERRED EMBODIMENTS

By "ceramic body compositions" is meant those compositions comprising particulate siliceous materials which may be formed into finished wares by providing a water-reduced suspension or plastic mass thereof, forming said suspension or plastic mass into a green ware and drying and firing the green ware to a hard permanent shape. The particulate siliceous materials can generally be any of those conventionally employed in the art. Thus, the ceramic body composition can comprise, for instance, one or more clays of the kaolinite, montmorillonite or illite groups such as china, ball, potters, vitrifying, slip or brick clays; talcs such as pyrophyllite or block talc; crystalline silicas such as potters flint, sandstone, quartzite or diatomaceous earth; feldspars; wollastonite and sillimanite.

An essential component of the ceramic body compositions employed in the practice of the invention is a finely-divided amorphous oxide component selected from the group consisting of silica, alumina or mixtures thereof. Said finely-divided amorphous oxide component is distinguishable from the siliceous materials conventionally employed in the preparation of ceramic body compositions by its relatively amorphous structure (as determined by X-ray diffraction analysis) and/or by its very small average ultimate particle size of less than about one micron and, preferably, of less than about 100 millimicrons. Ultimate particle size can be suitably determined, for purposes of the present invention, by electron microscopic analysis. The amorphous finely-divided oxide component of the invention is also distinguishable from conventional siliceous body materials by its relatively high surface area of at least about 20 $m^2/g$ as determined by the so-called "B.E.T." nitrogen absorption isotherm technique. The B.E.T. (Brunauer-Emmet-Teller) method is completely described in an article appearing in the Journal of the American Chemical Society, Vol. 60, page 309 (1938).

Finely-divided amorphous silicas, aluminas and silica-alumina mixtures and co-formed silica/aluminas suitable for use in the present invention can be prepared by a number of diverse methods. For instance, it is known that such oxides can be produced by precipitation from a solution of a corresponding alkali metal silicate, aluminate or other silicon or aluminum salt by controlled acidulation or neutralization of such solution with a mineral acid or acid salt. There results the precipitation of a hydrosol which may then be washed free of alkali metal salts or aged to a gel or semi-gel state prior to such washing. The washed oxide may be supplied as an aqueous suspension thereof or it may be dried and ground to a colloidal impalpable powder. Further details relative to such wet precipitation techniques may be had by reference to such patent literature as: U.S. Pat. No. 2,900,348, Ahlberg et al.; 2,920,974, Allen; 2,995,422, Atkinson et al; 3,012,973, Atkins; 3,034,913, Lagerstrom and 3,172,726, Burke, Jr. et al.

The finely-divided amorphous oxides forming an essential component of the ceramic body compositions of the invention can also be produced by pyrogenic processes in which a silicon or aluminum compound, particularly a halide or mixture of halides, is vaporized and the resulting vapors subjected to oxidation and/or hydrolysis at temperatures in excess of about 800° C. In a variant of this general method of production a silicon or aluminum oxide starting material is vaporized and disassociated by a thermal plasma (which may be an electric arc) to a lower oxidation state and then recondensed to the finely-divided amorphous oxide of higher oxidation state. Details of various pyrogenic silica, alumina and silica/alumina processes may be had by reference to: U.S. Pat. Nos. 2,428,178, Reik et al; 2,573,057, Porter; 2,990,249, Wagner; 3,024,089, Spencer et al.; 3,043,660, Hughes et al.; 3,086,851, Wagner; 3,130,008, Stokes et al.; 3,416,890, Best et al.; 3,423,184, Beigler et al. and 3,642,453, Chilton et al.

The amount of the finely-divided amorphous oxide component forming part of the ceramic body composition is subject to considerable variation and is dependent upon such considerations as: the surface area of the particular finely-divided oxide employed, the nature of the other body materials present, the extent of hydrophobicity desired to be imparted to the finished ceramic ware, the types of organosilicon compounds to be employed in rendering the finished ware hydrophobic, the firing temperature and time to which the formed green ware is to be subjected, and the like. Suffice it to say, therefore, that in its broadest aspect, the present invention contemplates the presence in the ceramic body composition of a minimum quantity of the finely-divided amorphous oxide which is effective to result in a fired ceramic ware having substantially improved susceptibility to the chemisorption of reactive organosilicon chemical groups thereto. Generally speaking, the greater the surface area of the finely-divided amorphous oxide component employed the less the quantity of said component required to yield a given level of hydrophobicity. Thus, for a given ceramic body composition to be formed into a given ware under a given firing regimen, the presence therein of, say, a pyrogenic fume silica having a BET-$N_2$ surface area of 325 $m^2/g$ will yield a fired ware having a greater capacity to chemisorb organosilicon groups to the amorphous oxide component thereof than will a similar composition containing an equal quantity, by weight, of a fume silica having a BET-$N_2$ surface area of only about 225 $m^2/g$. Bearing the foregoing in mind, therefore, those of skill in the art will recognize that the precise quantity of the finely-divided amorphous oxide component required to ultimately result in a ware of desired hydrophobicity can be readily determined in practice. We have found that, in general, a concentration of said finely-divided amorphous oxide in the amount of between about 2 and about 40 weight percent by weight of the total dry components of the ceramic body composition will usually suffice to provide the necessary susceptibility of the fired ware to the subsequent reactive organosilicon compound treatment thereof.

In addition to the above, of course, the ceramic body compositions of the invention can also include the usual aggregate materials, fluxes, dyes, colorants, and the like.

Accordingly, from the foregoing, it is apparent that the ceramic body compositions of the present invention are conventional in nature with the exception of the presence therein of the finely-divided amorphous oxide component. In terms of the present invention, it is the presence of said finely-divided oxide component which confers to the fired ware the capability to engage in a hydrophobically effective treatment of the fired ware with the reactive organosilicon treating agent.

As will be readily appreciated, the ceramic body compositions of the invention can generally be prepared by dry blending of the various dry components thereof prior to conversion into a water-wet suspension or plastic mass for the forming operation. Where the ceramic body composition is originally supplied as an aqueous suspension or plastic mass or where the amorphous oxide is supplied as an aqueous suspension, sol or gel, however, the finely-divided amorphous oxide can generally be suitably dispersed into the body composition by use of conventional dispersion methods such as by mulling, roll milling, ball milling or energetic stirring of the components utilizing a high speed stirrer or blender.

The forming of the ceramic body compositions of the invention into green wares can be accomplished by any conventional method of the art. For instance, the dry ceramic body composition can be blended thoroughly and the resulting dry mix formed by powder pressing. Where powder forming techniques are contemplated, however, it is generally desirable that the powder be at least somewhat moistened prior to the forming operation, thereby to normally result in improvement of the strength of the green ware. Usually, the forming methods contemplated will involve the working of a water-reduced suspension or plastic mass of the ceramic body compositions. Thus, such conventional forming techniques as vacuum auger or piston extrusion, hand throwing, hand molding, press molding or jiggering of the composition in the form of a plastic mass of the body composition or solid or drain casting of the composition in the form of a "slip" are all contemplated as suitable forming methods in the practice of the invention.

Having thus formed a green ware of the desired shape it is then necessary to dry and fire said ware to a hard, permanently form-stable ceramic ware. In the practice of the present invention, said drying and firing can be accomplished in any suitable conventional manner, the single most important criterion attendant the firing step being that said firing take place under conditions of time and temperature below that at which substantial sintering of the finely-divided amorphous oxide component takes place. This sintering temperature/time regimen, which is to be avoided, will vary depending upon the specific finely-divided amorphous oxide forming part of the ceramic body composition, its particular chemical composition, particle size and concentration. Suffice it to say, therefore, that firing temperatures in excess of about 800° C. should normally be avoided or at least the time of exposure of the green ware to such temperatures should be minimized. A convenient method to determine the maximum tolerable temperature/time regimen of a particular ceramic body composition is to experimentally determine that temperature/time regimen at which substantial sintering of the amorphous oxide, taken alone, occurs. By "substantial" is meant sintering to the extent that there occurs a reduction in BET-$N_2$ surface area of the finely-divided oxide of more than about 20%.

The underlying reason for preventing substantial sintering of the amorphous oxide component during firing of the green ware resides in the fact that the effectiveness of the subsequent treatment with reactive organosilicon compound hydrophobing agent(s) is dependent upon the preservation of a substantial population of hydroxyl groups chemically bound to the surface of the finely-divided amorphous oxide component. Where said population of surface hydroxyl groups is substantially lessened, such as inherently occurs upon sintering of said component, the desired chemisorption of organosilicon groups onto the surface of the amorphous oxide can be substantially diminished. While the other supra-micron siliceous components of the ceramic body composition may also comprise chemically bound hydroxyl groups, the population of these latter hydroxyl groups, on a volume basis, is substantially less than that of the sub-micron oxide and, therefore, while some chemisorption of organosilicon groups may occur to some degree onto the surface of such other components, the extent thereof is minimal relative to that which occurs onto the surface of the amorphous sub-micron oxide.

After firing, the ceramic ware is cooled and then contacted with at least one reactive organosilicon compound fluid so as to permeate the body of the ware with the fluid. Many organosilicon compounds are known which are suitable for this contacting step and which are reactive or can be rendered reactive during or subsequent to said contacting step. Generally, such compounds are those which are available in liquid or vaporous form and which have reactive sites through which the chemisorption reaction to the hydroxyl groups of the amorphous finely-divided oxide component distributed throughout the body of the ceramic ware can be effectuated. Specific examples of useful organosilicon compounds for purposes of the invention are: organohalosilanes such as $(CH_3)_3SiCl$, $(CH_3)_2SiBr_2$, $(CH_3)_2SiCl_2$, $(C_4H_9)_3SiCl$; organosilylamines such as $(CH_3O)_3Si(CH_2)_3NH(CH_2)_2NH_2$, $(CH_3O)_2(CH_3)SiCH_2CH(CH_3)CH_2NHCH_2CH_2NH_2$; cyclic organosilazanes such as hexamethylcyclotrisilazane, organocyclosiloxanes such as hexamethylcyclotrisiloxane; polyorganosiloxanes such as polydimethylsiloxanes and polymethylphenylsiloxanes; alkylhydrogen silicone oils; hydroxy-endblocked polydiorganosiloxanes and particularly monohydroxy-endblocked polydiorganosiloxanes such as:

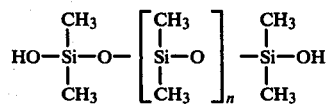

wherein n is an integer $\geq 1$; and organodisilazanes such as $(CH_3)_3SiNHSi(CH_3)_3$ and $(C_4H_9)_3SiNHSi(C_4H_9)_3$. The organodisilazanes and, in particular, hexalkyldisilazanes such as hexamethyldisilazane, are particularly useful treating agents in the invention as are the hydroxy-endblocked polydiorganosiloxanes.

It is known to treat finely-divided metal and metalloid oxides with various organosilicon compounds in order to render the oxides hydrophobic. However, the known methods contemplate the treatment of the oxides, alone, and not by in situ treatment of such oxides after they have been dispersed into an end-item composition and after said composition has been subjected to ware forming, drying and firing steps. Nevertheless, we believe that the essential chemistry of the chemisorption reactions undertaken in the preparation of the hydrophobic ceramic wares of the present invention is similar to that which takes place in respect of reactive organosilicon compound treatment of finely-divided metal and metalloid oxides alone and, for a greater understanding of said chemistry, reference may be had to the following U.S. Pat. Nos.: 2,589,705, Kistler; 2,866,716, Broge; 3,334,062, Brown et al; 3,377,311, Roch et al; 3,600,326, Wilcox et al; 3,920,865, Laufer et al; 2,938,009, Lucas; 3,969,308, Penneck; 3,948,676, Laufer and 3,924,029, Schutte et al.

Contacting of the fired ceramic ware with the reactive organosilicon compound treating agent can be achieved simply by steeping of the ware in the organosilicon liquid or vapor for a period of time sufficient to allow imbibition of the treating agent into the body of the ceramic ware. The contacting step can be undertaken under room temperature conditions of temperature or pressure or, if desired, at elevated temperatures or pressures. Where it is desired to maximize the rate of permeation of the ceramic ware with the treating agent, in liquid form, it is also usually possible to subject the system to a substantial hydraulic head such as can be achieved utilizing a centrifugal infiltration technique wherein the ware is placed at the periphery of a spinning bowl containing the liquid treating agent. The infiltration of the ceramic ware by the organosilicon liquid treating agent contacted therewith then proceeds aided by the "G" forces created by the action of the centrifuge.

The quantity of organosilicon treating agent to be employed is subject to considerable variation and is dependent upon such parameters as: the degree of hydrophobicity desired to be imparted to the ceramic ware; the quantity of finely-divided amorphous oxide dispersed throughout the body of the ware; the hydroxyl group population of said dispersed finely-divided oxide; the nature of the organosilicon compound in terms of its reactivity with said dispersed finely-divided oxide and the like. Since the contacting step will usually be undertaken utilizing the reactive organosilicon compound treating agent in undiluted bulk form, the quantity of imbibed organosilicon compound will usually be in excess of stoichiometry and will thus not normally be critical. Where the reactive organosilicon treating agent is a polydiorganosiloxane liquid, however, such as a monohydroxy-endblocked polydiorganosiloxane, we have found that the minimum quantity thereof to be imbibed into the ceramic ware should be at least sufficient to satisfy the equation:

groups remaining on the surface of the amorphous finely-divided oxide after the initial treatment thereof.

The conditions under which the chemisorption reaction is undertaken are subject to considerable variation and will depend, in large measure, upon the particular type of reactive organosilicon compound treating agent employed. For instance, where an organohalosilane is utilized, such as dimethyldichlorosilane it is important that the ceramic ware be substantially free of molecular water at the time of its contact with the treating agent. This substantial dryness, of course, will normally exist at the end of the firing step. However, measures should be taken during cooldown of the fired ware to prevent moisture pickup, such as by cooling of the ware in a dessicator. Contrarily, in the case of treatment of the ware with a disilazane, the chemisorption reaction is fostered by the presence of molecular moisture. Thus, in this instance, it will be desirable to moisten the ceramic ware prior to, during or after permeation of the ware with the disilazane. This moisturizing can generally be

| Minimum absorbed siloxane reagent (% by weight untreated ware) | = | % by wt. sub-micron amorphous oxide in fired ceramic body | × | BET-$N_2$ surface area of sub-micron amorphous oxide (m$^2$/g) | × 0.0007 |
|---|---|---|---|---|---|

Also in the case of polydiorganosiloxane liquid treating agents, it has been discovered that large excesses of such treating agents, i.e. greater than about ten times the amount required to satisfy the above equation, should be avoided since such extreme excesses tend to detract from the ultimate hydrophobic properties imparted to the ware unless the excess is removed prior to or after the chemisorption reaction such as by extraction with an organic solvent, for example, toluene or hexamethyldisilazane.

In order to develop maximum hydrophobicity of the fired ceramic ware, we have discovered that it is generally preferable to carry out at least two hydrophobing treatments thereof, utilizing reactive organosilicon compounds of different genera in each of said treatments. For instance, we have found that superior hydrophobic properties result when a fired ceramic ware of the invention is subjected to a dual hydrophobing treatment first utilizing a reactive polydiorganosiloxane fluid and then a reactive disilazane. We have also found that similarly good results accrue when a first hydrophobing treatment is undertaken utilizing an organohalosilane as the reactive organosilicon compound followed by a second hydrophobing treatment utilizing a disilazane as the reactive organosilicon compound. It is not fully understood as to why this dual hydrophobing treatment results in maximization of the hydrophobic properties of the ceramic ware. Although we do not wish to be bound by this explanation, it is believed that even after the first treatment, depending somewhat upon the specific reactive organosilicon compound employed, there remain unreacted hydroxyl groups on the surface of the finely-divided amorphous oxide component which remain available for entering into a chemisorption reaction with a reactive organosilicon compound of a different genus from that originally employed. Accordingly, the second treating step utilizing a reactive organosilicon compound of different genus is believed to be effective in the attachment of yet further organosilicon groups to those unreacted hydroxyl conveniently accomplished prior to the disilazane contacting step by exposing the ware to an atmosphere of high humidity for a period of time sufficient to allow equilibration of the moisture throughout the body of the ware or by wetting of the ware with bulk water followed by storage thereof in a moist atmosphere until such time as the imbibed moisture content thereof has equilibrated. In the case of hydrophobing treatment with reactive polydiorganosiloxanes, the chemisorption reaction is generally fostered by heat treatment of the treated ware at temperatures of between about 360° to about 550° F. (182° to 288° C.).

There follow a number of illustrative non-limiting examples.

EXAMPLE 1

This example is illustrative of certain specific embodiments of the invention and, further, demonstrates the importance of the presence of the finely-divided amorphous oxide component in the ceramic body composition. In accordance with this example, a control slip was prepared comprising 937 grams water and 1837 grams of aluminum silicate #160 extender, a white mineral clay having a particle size distribution of 95% by weight larger than 1 micron, said mineral clay product being manufactured by Engelhard Minerals and Chemicals Corp., Iselin, N.J. Another similar slip composition was prepared, exemplary of a body composition of the invention, said composition comprising, in addition to the above ingredients, in the stated amounts, 250 grams of Cab-O-Sil ® M-5, a finely-divided sub-micron pyrogenic amorphous silica prepared by flame hydrolysis of silicon tetrachloride and having a BET-$N_2$ surface area of about 200 m$^2$/g (Cabot Corporation, Boston, Mass.).

A number of green ware tiles are produced from each of the control and exemplary ceramic body compositions by solid casting of the respective slips into plaster of Paris book molds, the mold cavities each having nominal dimensions of 5×5×0.25 inches (12.7×12.7×0.63 cm). In casting of the slips, each mold was repetitively filled with the slip on an approximately hourly basis until such time as the mold cavity remained completely full of solid components. Thereafter, the molds were allowed to stand for about 24 hours prior to opening and removal of the green ware tiles therefrom.

Next, the green ware tiles produced from each of the ceramic body compositions were dried for about 12 hours in an air circulating oven maintained at a temperature of about 180° F. (82.2° C.). Then, the dried tiles and a sample of the fumed silica component employed in the exemplary body composition of the invention were placed in a kiln at room temperature. The kiln was thereafter fired so as to slowly raise the temperature therein to about 1443° F. (784° C.) within a period of between about four and about five hours. Upon attainment of firing temperature the kiln was shut down and allowed to cool, along with its contents, to about room temperature. The fired tiles were found to be hard and form-stable. The fired sample of the fumed silica was subjected to BET-$N_2$ analysis and it was found that the firing regimen employed did not substantially reduce the surface area thereof.

The fired tiles were each weighed and then immersed, together, in a bath of monohydroxy-endblocked polydimethylsiloxane fluid, L-45-50, Union Carbide Corporation, New York, N.Y., said fluid having a viscosity of about 50 centistokes. Upon removal from this bath, the tiles were then placed in a rack and allowed to drain for a period of about 24 hours. The drained tiles were then reweighed and it was found that those tiles formed of the control body composition underwent an average weight gain of about 9 gms as a result of the treatment with the polydimethylsiloxane fluid while the tiles prepared from the ceramic body composition of the invention underwent an average weight gain of about 9.3 gms. This last-mentioned weight gain corresponds to about 3 times the amount called for by the equation:

| Minimum absorbed siloxane reagent (% by weight untreated ware) | = | % by wt. sub-micron amorphous oxide in ceramic body | × | BET-$N_2$ surface area of sub-micron amorphous oxide | × | 0.0007 |

Next, the chemisorption reaction was fostered by heat treatment of the treated tiles in an air oven maintained at a temperature of about 400° F. (204° C.) for a period of about four hours. The tiles were then cooled to room temperature and a first portion of both the control and exemplary tiles resulting from the foregoing treatment retained for testing of the water-repellent and hydrophobic properties thereof. A second portion of these tiles was then subjected to the following second treatment.

Said second portion of tiles was placed in a humidifying cabinet maintained at room temperature and a relative humidity of about 85% for a period of about 24 hours. The thusly humidified tiles were then immersed in a bath composed of hexamethyldisilazane for a period of about 24 hours. Substantially immediately thereafter, the tiles were placed on the rack of a glass desiccator, the lower chamber of which contained a pool of hexamethyldisilazane rather than a desiccant material, and the tiles allowed to drain and steep in the hexamethyldisilazane vapors for about four days. The tiles were then removed from the desiccator and placed in a ventilated hood in order to purge ammonia vapors formed as a by-product of the chemisorption reaction and any unreacted hexamethyldisilazane therefrom. Under these conditions, substantially complete purging of the tile bodies occurred, as was evidenced by cessation of the emanation of the odor of ammonia therefrom, in about twenty-four hours.

The tiles of each portion were then subjected to various tests relating to surface water-repellency and body hydrophobicity. Firstly, the average contact angles resulting when several droplets of water are placed on a horizontal major surface of each tile were determined optically and the results thereof are as follows:

|  | Contact Angle, Avg. (°) |
|---|---|
| Control, First Portion | 80 |
| Exemplary, First Portion | 110 |
| Control, Second Portion | 85 |
| Exemplary, Second Portion | 130 |

As can be noted, the exemplary tiles containing the amorphous finely-divided fume silica component display markedly superior water-repellent properties as compared to the controls. Moreover, the average contact angle exhibited by the exemplary tiles subjected to the dual hydrophobing treatment utilizing two organosilicon treating agents of different genera is substantially greater than that of the exemplary tiles subject to only the first of said treatments.

In another test, several sample tiles are broken and the fragments thereof immersed in water. In each instance, the fragments of the exemplary tiles prepared in accordance with the invention, when so immersed, displayed a uniform silvery sheen over the entire surface thereof, including the fragment edge portions. The presence of this phenomenen at said edge portions evidences that the hydrophobing treatment of the exemplary tiles of the invention was achieved throughout the entire tile body and was not restricted to the original exterior surfaces of the unblemished tiles. Moreover, this silvery sheen was not observed with respect to either of the control tile fragments. In these, the air layer responsible for the silvery sheen optical phenomenon was not observed to be present under immersion although, when removed from the water bath, these control tile fragments did shed their surface water burdens with considerable rapidity.

Certain others of the control and exemplary tiles were placed horizontally in a freezer and several drops of water placed upon the uppermost surface of each. The tiles, bearing their respective water droplets thereon, were then frozen overnight. Upon removal from the freezer, the frozen droplets present on the surfaces of the exemplary tiles were found to be only very lightly adhered to the tile surface, said droplets being readily removed merely by light tapping of the frozen tiles edgewise on a firm surface. On the other hand, the frozen droplets formed on the control tile surfaces were found to be tightly adherent thereto and could not be removed by the foregoing procedure. Moreover, in certain instances, it was noted that the water droplets placed onto the control tiles had collapsed into a tenaciously adherent film prior to freezing thereof rather than having maintained their original droplet form.

EXAMPLE 2

In this example, two different ceramic body composition "slips" are prepared, formed, dried and fired and several of the fired specimen wares of each composition subjected to a dual hydrophobing treatment utilizing two organosilicon treating agents of different genera. The water hold-out properties of these treated specimen wares were then compared against those of specimens which had not been treated with the organosilicon compounds. The slip compositions were prepared by dry blending of the solid components thereof followed by vigorous dispersion of the blended solids into the stated quantities of water. The specific materials and quantities thereof employed in the preparation of the slip compositions were as follows:

| Ingredient | Weight (grams) |
|---|---|
| Composition 1 | |
| Aluminum Oxide C, a fumed amorphous alpha-alumina having an average ultimate particle diameter of about 0.015 microns and a BET-$N_2$ surface area of about 100 $m^2/g$, produced by Degussa, Pigments Division, Frankfurt, Germany | 376 |
| Glasgrain GP31, a white fused silica having a particle size distribution of 99% by weight finer than 30 microns and 21% by weight finer than 1 micron, processed by Harbison-Walker Refractories, Pittsburg, Pa. | 1711 |
| Water | 1075 |
| Composition 2 | |
| Fumed Amorphous Silica RS-1, a grey amorphous silica produced as a by-product of the manufacture of aluminum and having an average ultimate particle diameter of 0.4 micron and a BET-$N_2$ surface area of 21 $m^2/g$ (Reynolds Metals Co., Richmond, Virginia) | 1774 |
| Novacite L-207A, a white microcrystalline mineral silica having an average ultimate particle diameter of about five microns and a BET-$N_2$ surface area of 2 $m^2g$ (Malvern Minerals Co., Hot Springs, Arkansas) | 313 |
| Water | 894 |

Utilizing plaster of Paris book molds, the above slip compositions were fabricated into solid green ware tiles, each having dimensions of about 4×4×½ inch (10.2×10.2×1.3 cm). The resulting green ware tiles were then dried in an air oven, the casting and drying steps each being undertaken substantially in accordance with the procedure described in Example 1. After drying, the tiles formed of Composition 1 were fired in a stationary kiln to a temperature of about 1685° F. (918° C.), the firing cycle being between about 4 and 5 hours in length. The tiles formed of Composition 2 were separately fired in a stationary kiln over a cycle of similar duration and to a temperature of about 1443° F. (784° C.). A sample of the amorphous alumina component of Composition 1 and a sample of the amorphous silica component of Composition 2 were placed in the respective kilns prior to these firings. After the firings, the alumina and silica samples were each subjected to BET-$N_2$ surface area analyses which revealed that no substantial reductions in the surface areas of these components had taken place. Several of each group of the fired ceramic tiles were retained as control specimens for immersion testing.

Several others of each group of the fired ceramic tiles were subjected to a dual hydrophobing treatment thereof in accordance with the procedure set forth in Example 1.

The control tiles and treated tiles were each weighed and then fully immersed in a pool of water for a period of about three hours. Upon removal from the pool, the tiles were drained for about 15 minutes in order to allow drainage of surface water therefrom and were then each reweighed to determine the quantity of water imbibed thereinto. The control tiles formed of Composition 1 were found to have undergone an average weight gain of about 14.1%. The organosilicon compound-treated tiles formed of Composition 1 however, were found to have undergone an average weight gain of only about 0.8%. The control tiles formed of Composition 2 were found to have undergone an average weight gain of about 13.9% while the organosilicon compound-treated tiles formed of Composition 2 suffered an average weight gain of only about 0.6%.

EXAMPLE 3

This example demonstrates, inter alia, (a) the deleterious effect upon the hydrophobic properties of the finished ware due to overfiring, (b) a preferred modification of the dual hydrophobing treatment employed in Examples 1 and 2, and (c) the use of an aqueous dispersion of colloidal precipitated silica as the source of the amorphous finely-divided oxide in the ceramic body composition.

The ceramic body composition was prepared by charging into the bowl of a high-speed blender 621 grams of Ludox HS-40, an aqueous dispersion comprising 40% by weight of a precipitated amorphous silica having an average particle diameter of about 0.012 micron and a BET-$N_2$ surface area of 230 $m^2/g$ (E. I. DuPont de Nemours and Company, Wilmington, Del.). The blender was then operated at medium speed and there was slowly added 580 grams of a fused particulate silica of the type employed in Example 2, Composition 1. After completion of the addition of the fused silica, the blender was then switched to high speed operation for about five minutes to complete the dispersion operation and to result in a fluid ceramic body composition useful as a slip.

Several green ware tiles were prepared from this composition utilizing the molds and solid casting procedure described in Example 1. The resulting green ware tiles were dried overnight in an air oven maintained at about 180° F. (82° C.). Several of the dried tiles were then fired in a stationary kiln to a temperature of 1165° F. (629° C.) over a four to five hour firing cycle while several others thereof were fired over a similar cycle to a temperature of about 1685° F. (918° C.).

The fired ceramic tiles were then subjected to a dual hydrophobing treatment thereof substantially in accordance with the treatment regimen set forth in Example 1. However, in the present example, the tiles, after the initial treatment with the polydimethylsiloxane, were not humidified preceding the disilazane treatment by storage in a humidifying cabinet. Rather, the tiles were simply immersed in water for about 45 minutes and then allowed to drain for about one hour preparatory to the hexamethyldisilazane treatment thereof. Thereafter, the hexamethyldisilazane treatment was undertaken in the manner of Example 1.

After this dual hydrophobing treatment, the contact angles of water droplets were determined in the manner employed in Example 1. It was discovered that, whereas those tiles fired to the lower temperature displayed an average contact angle of 130°, those tiles fired to the higher temperature displayed an average contact angle of only about 100°. Further when water droplets were placed on the tiles and the tiles then tilted from the horizontal to determine the angle at which said droplets were shed from the tile surfaces, those tiles fired to the lower temperature had only to be tilted 1 degree from the horizontal, whereas those tiles fired to the higher temperature had to be tilted in excess of 20 degrees. Accordingly, these latter mentioned tiles were overfired from the standpoint of development of maximum hydrophobicity thereof.

EXAMPLE 4

This example demonstrates the employment of a dual organosilicon compound treatment of the fired ceramic ware wherein one of the two reactive organosilicon compounds employed is an organohalosilane. A water-reduced ceramic body composition was made up by dry blending of the solid ingredients followed by dispersion thereof into the recited quantity of water to form the slip.

| Composition | |
|---|---|
| Ingredient | Quantity |
| Cab-O-Sil ® M-5 | 84 |
| Glasgrain GP31 | 2003 |
| Water | 937 |

Several tiles were molded from this slip composition by solid casting thereof in accordance with the procedure of Example 1. The resulting green ware tiles were dried overnight in an air circulating oven maintained at about 180° F. and were then fired in a stationary kiln to a temperature of about 1443° F. (784° C.), the firing cycle having a duration of between 4 and 5 hours. The fired tiles were cooled to room temperature in a desiccator in order to maintain dryness thereof and were then subjected to a dual hydrophobing treatment employing as the reactive organosilicon compound in the first step, dimethyldichlorosilane, and in the second step, hexamethyldisilazane. In the first treating step, the tiles were bathed in liquid dimethyldichlorosilane for a period of about 15 minutes. This resulted in substantially complete imbibition of the organohalosilane into the tile bodies as was evidenced by the cessation of displaced air bubbles rising to the liquid surface from the tiles. The treated tiles were then substantially immediately transferred to the rack of a vented desiccator, the lower chamber of which was provided with a pool of dimethyldichlorosilane, thereby to ensure that the atmosphere within the desiccator was maintained saturated with organohalosilane vapors. The thusly racked tiles were allowed to remain in the desiccator for a period of about 4 days. The treated and drained tiles were then transferred to a ventilated hood for about two days in order to purge hydrogen chloride by-product and any unreacted organohalosilane from the tile bodies. Several of the tiles resulting from this first organosilicon compound treatment were retained for comparison testing thereof against several other of the tiles which were subjected to an additional hydrophobing treatment utilizing hexamethyldisilazane as the reactive organosilicon compound. This second group of tiles was treated with hexamethyldisilazane in the manner described in Example 1.

The contact angles of water droplets placed on the two sets of tiles were then determined optically. Those tiles which had been treated with dimethyldichlorosilane, alone, demonstrated an average contact angle of about 110° whereas those tiles subjected to the dual treatment with dimethyldichlorosilane and hexamethyldisilazane demonstrated an average contact angle of about 130°. When immersed in water, fragments of both groups of tiles each produced the characteristic silvery sheen associated with exceptional hydrophobicity, said sheen appearing uniformly over the broken surfaces as well as the original tile surfaces.

Samples of each tile set were positioned on a flat horizontal surface and were exposed for a period of 2 months to ordinary weathering conditions of rain, sunshine and the like. Upon completion of this weathering, it was found that those tiles treated with dimethyldichlorosilane, alone, had lost their surface hydrophobicity whereas those tiles subjected to the dual treatment remained hydrophobic.

The hydrophobic fired ceramic wares producible in accordance with the present invention are possessed of several attributes which render them ideally suited for many specific applications. Firstly, due to the fact that the hydrophobic ceramic wares of the invention are not provided with a continuous coating material thereover and, further, since the hydrophobing treatment of the invention does not result in physical "plugging" of the pores of the ceramic body, the wares of the invention substantially retain their original permeability characteristics relative to gases. As a result of this retained ability to transpire gases the hydrophobic fired ceramic wares of the invention, when formed to the appropriate configuration, can be utilized as filtration media for the removal of water from gases. Also, the ceramic wares of the invention can usually be beneficially employed in various marine environments wherein occlusive marine growth on underwater surfaces is a problem. Due to the hydrophobic nature of the wares of the invention, the rate at which such growth occurs thereon is usually vastly reduced. Thus, the ceramic wares of the invention can take the form of aeration sparge blocks for aquariums wherein the air is supplied to the block by any suitable means, transpires through the block and is dispensed into the aquarium water. While algal growth often occludes conventional ceramic sparge blocks, such has not been found to be a serious problem utilizing blocks prepared in accordance with the invention. Due, apparently, to the surface hydrophobicity thereof, the normal algal growth of an aquarium environment cannot attach adherently to hydrophobic ceramic wares of the invention. Rather, such growth tends not to form at all on such hydrophobic fired ceramic surfaces or, at the least, forms thereon in an essentially non-adherent, readily removable manner. It is further proposed that suitably formed hydrophobic ceramic wares of the invention can also be usefully employed to cover the hulls of marine vessels, buoys, sea water cooling intake conduits and the like, thereby to avoid, minimize or at least slow the rate of growth of marine organisms thereon. Moreover, since hydrophobicity is present throughout the bodies of the ceramic wares of the invention, the hydrophobic nature of such marine installations as proposed herein are thereby rendered resistant to physical damage to the surfaces of the wares since, even if marred or scratched, there merely results the exposure of a fresh hydrophobic surface. The ceramic wares of the invention are also suitable for use in substantially any outdoor application wherein superior water-repellency or resistance to icing is an important consideration or attribute. For example, radomes can be constructed from or coated with suitably formed ceramic wares of the invention, thereby to preserve competent microwave transmission properties therethrough during periods of inclement weather and to mitigate against icing of the radome. Similarly, the ceramic wares of the invention can take the form of roofing materials such as tiles, slates or granules which, by virtue of their water-repellent nature, are resistant to staining and ice formation thereon. This last can be a particularly valuable benefit in respect of those roofing repair or replacement projects in which the roof structures operated upon have proved to be susceptible to the formation of ice dams.

As mentioned previously, a particularly useful application of the fired hydrophobic ceramic wares of the invention resides in the use thereof in the form of high-voltage electrical insulators for power lines. Here, the exceptionally water-repellent characteristics of the wares prepared in accordance with the invention prevent the formation of surface water films thereon due to rain, fog, condensation or the like. Rather, water applied to or formed on the surface of such wares tends to immediately bead up and run off and, as a consequence, the surface dielectric properties of high-voltage insulators prepared in accordance with the invention do not degrade substantially in inclement weather as do the dielectric properties of conventional glazed ceramic or glass insulators. Moreover, another problem common to the power transmission art in this country is ameliorated employing insulators constructed in accordance with the invention. In this, it is common experience that power line insulators are often shot at by vandals and, as a consequence the surfaces thereof are often chipped or otherwise physically traumatized. Utilizing insulators formed of the hydrophobic fired ceramics of the invention, however, such physical traumatizing of the surface of the insulator does not ordinarily rise to the catastrophic level of importance that it does utilizing ordinary glazed ceramic insulators because, as in the case of the marine structures discussed above, the freshly exposed chipped surface of an insulator of the invention is substantially as water-repellent as the original unblemished surface thereof.

A particularly interesting application of the hydrophobic ceramic wares of the invention resides in our discovery that such wares, when suitably formed and suitably arranged about a structure, can define an effective barrier to the encroachment of crawling insects. Many insects depend upon the presence of moisture on solid surfaces to provide the necessary "purchase" for their locomotion. Utilizing suitably formed hydrophobic fired ceramic wares of the invention, however, plurally arranged to present a substantially continuous band of hydrophobic ceramic material about the perimeter of a building or other structure desired to be protected, there is defined an essentially moisture-free barrier across which crawling insects cannot freely pass. We have found that this barrier structure is particularly effective when the hydrophobic ceramic barrier band is presented to crawling insects in a vertical or nearly vertical manner and of even greater preference, in a manner whereby encroaching insects are required to traverse the barrier in an at least somewhat inverted attitude. Thus, we contemplate hydrophobic fired ceramic wares of the invention in the form of elongate structures, such as producible by extrusion, and comprising a member adapted to be affixed in any suitable manner to the structure to be protected and a member integral therewith to define an exteriormost vertical, nearly vertical or inverted hydrophobic barrier surface. Such wares may be plurally affixed to the structure to be protected in an end-to-end manner, thereby to define a substantially continuous perimeter barrier thereabout. The simplest suitable form of the insect barrier ware of the invention can take the form of an elongate tile, a plurality of which can be secured in end-to-end fashion to the sidewalls of the structure to be protected. A preferred form of the crawling insect barrier is as an elongate extrusion thereof in a right angle cross-sectional shape, (⌐), wherein the vertical righthand flange thereof is adapted for securing to a vertical sidewall of the structure to be protected. In this construction, the vertical flange thereby presents a vertical exterior surface and the horizontal integral upper flange presents an interior surface thereof requiring an encroaching insect to traverse same in an inverted attitude. The preferred hydrophobic ceramic crawling insect barrier ware of the invention takes the form of an elongate, extruded ware of triangular cross-sectional shape, (◁), wherein the righthand base leg of the triangular shape is adapted for fixation to a vertical surface of the structure to be protected and wherein the lowermost adjacent side of the triangular shape forms an angle of between about 20° and 40° with said base leg. In the installation of this embodiment of the invention to a structure this adjacent leg is, of course, disposed to the bottom of the construction, thereby requiring an insect attempting to breach the barrier to adopt an at least partially inverted attitude. The following illustrative example demonstrates the utility of the ceramic wares of the invention as barrier structures to crawling insects.

EXAMPLE 5

Utilizing plaster of Paris book molds a number of green ware tiles of about $3 \times 3 \times \frac{1}{4}$ inch dimensions ($7.6 \times 7.6 \times 0.63$ cm) were prepared from a slip having the following composition:

| | |
|---|---|
| Pyrogenic silica of the type employed in Example 4 | 167 grams |
| Fused silica of the type employed in Example 4 | 1920 grams |
| Water | 937 grams |

The green ware tiles were dried and fired employing the procedure disclosed in Example 4. Several of these non-hydrophobically treated fired tiles were retained for testing. Several others thereof were subjected to a dual reactive organosilicon compound treatment in accordance with the procedure and utilizing dimethyldichlorosilane and hexamethyldisilazane as the treating agents as in Example 4.

Next, a sheet metal box was partitioned so as to define two distinct and separate chambers therein. The sidewalls of one of said chambers was continuously lined with the fired, but non-hydrophobically treated, tiles. The sidewalls of the second of said chambers was continuously lined with the fired hydrophobic tiles resulting from the dual organosilicon treatment thereof. The tiles lining each of the chambers were set at a negative angle to the sidewalls of about 30°.

Representative crawling insects, including several species of spiders and ants, were then placed in each of the tile-lined chambers and their activities observed. Those insects placed in the chamber lined with the untreated tiles had little difficulty in negotiating the tiles and all had soon escaped from the first chamber. The insects placed in the chamber lined with the hydrophobic ceramic tile wares of the invention, however, were observed to make multiple unsuccessful attempts to negotiate the tile walls of the second chamber. Interestingly, after about 2 hours, these insects appeared to thereafter forego such attempts and were observed to mill about on the floor of the chamber in a seemingly aimless manner. After about twenty-four hours, none of the insects had escaped from the second chamber.

Obviously, many changes, modifications and alterations may be made in the above description without departing from the essential spirit and scope of the invention. Accordingly, it is intended, and should be so understood, that the foregoing description is to be regarded as illustrative of the principles of the invention and of certain preferred embodiments thereof and not in a limiting sense.

The embodiments of the invention in which an exclusive property or privilege is claimed are defined as follows:

1. A fired ceramic ware comprising a formed and fired ceramic body composition having dispersed therein a substantially unsintered finely-divided particulate amorphous oxide component selected from the group consisting of silica, alumina and mixtures thereof, said particulate amorphous oxide component having an average ultimate particle diameter of not greater than about one micron and a BET-$N_2$ surface area of at least about 20 $m^2/g$, said particulate amorphous oxide component having chemisorbed to the surface thereof organosilicon groups produced by reaction in situ between said oxide component dispersed throughout said formed and fired body and at least one reactive organosilicon compound, the quantity of said amorphous oxide component and the concentration of said chemisorbed organosilicon groups thereon being effective to render the body hydrophobic and water repellent.

2. The ware of claim 1 wherein said finely-divided particulate amorphous oxide component is silica.

3. The ware of claim 1 wherein said finely-divided particulate amorphous oxide component is alumina.

4. The ware of claim 1 wherein said organosilicon group-containing finely-divided particulate amorphous oxide is the product of reaction between said oxide component and an organohalosilane.

5. The ware of claim 1 wherein said organosilicon group-containing finely-divided particulate amorphous oxide is the product of reaction between said oxide component and a disilazane.

6. The ware of claim 1 wherein said organosilicon group-containing finely-divided particulate amorphous oxide is the product of reaction between said oxide component and a monohydroxy-endblocked polydiorganosiloxane.

7. The ware of claim 1 wherein said organosilicon group-containing finely-divided particulate amorphous oxide is the product of reaction between said oxide component and each of a monohydroxy-endblocked polydiorganosiloxane and a disilazane.

8. The ware of claim 1 wherein said organosilicon group-containing finely-divided particulate amorphous oxide is the product of reaction between said oxide component and each of an organohalosilane and a disilazane.

9. The ware of claim 4 or 8 wherein said organohalosilane is dimethyldichlorosilane.

10. The ware of any of claims 5, 7 or 8 wherein said disilazane is hexamethyldisilazane.

11. The ware of claim 6 or 7 wherein said monohydroxy-endblocked polydiorganosiloxane is a polydimethylsiloxane.

12. The ware of claim 1 in the form of a high-voltage electrical insulator.

13. The ware of claim 1 wherein said finely-divided particulate amorphous oxide component is a pyrogenic oxide.

14. The ware of claim 1 wherein said finely-divided particulate amorphous oxide component is a precipitated oxide.

15. The ware of claim 1 wherein said finely-divided particulate amorphous oxide component has an average ultimate particle diameter of less than about 100 millimicrons.

* * * * *